United States Patent
Ma

(10) Patent No.: US 9,063,375 B2
(45) Date of Patent: Jun. 23, 2015

(54) LCD PANEL, LCD DEVICE, AND METHOD FOR MANUFACTURING PANEL

(75) Inventor: Xiaolong Ma, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 285 days.

(21) Appl. No.: 13/519,652

(22) PCT Filed: May 22, 2012

(86) PCT No.: PCT/CN2012/075867
§ 371 (c)(1),
(2), (4) Date: Jun. 28, 2012

(87) PCT Pub. No.: WO2013/117064
PCT Pub. Date: Aug. 15, 2013

(65) Prior Publication Data
US 2013/0208221 A1 Aug. 15, 2013

(30) Foreign Application Priority Data
Feb. 9, 2012 (CN) .......................... 2012 1 0028801

(51) Int. Cl.
*G02F 1/1337* (2006.01)
*G02F 1/1339* (2006.01)

(52) U.S. Cl.
CPC ............ *G02F 1/1337* (2013.01); *G02F 1/1339* (2013.01)

(58) Field of Classification Search
CPC .................................................... G02F 1/1339
USPC .................................................... 349/123, 153
See application file for complete search history.

(56) References Cited

U.S. PATENT DOCUMENTS

2004/0127136 A1* 7/2004 Park et al. .......................... 445/24
2009/0147205 A1* 6/2009 Mizuno et al. ................ 349/153

FOREIGN PATENT DOCUMENTS

| CN | 1841168 A | 10/2006 |
| CN | 101136359 A | 3/2008 |
| CN | 101191935 A | 6/2008 |
| JP | 2005181795 A | 7/2005 |
| JP | 2007047253 A | 2/2007 |
| JP | 2007248832 A | * 9/2007 |

OTHER PUBLICATIONS

Wu Riwen, the International Searching Authority written comments, Sep. 2012, CN.

* cited by examiner

*Primary Examiner* — Jessica M Merlin
(74) *Attorney, Agent, or Firm* — IPro, Inc.; Na Xu

(57) ABSTRACT

The invention provides an LCD panel, an LCD device, and a method for manufacturing a panel. The LCD panel includes an upper substrate and a lower substrate which are arranged opposite to each other. Opposite inner sides of the upper substrate and the lower substrate are respectively provided with a layer of alignment film, a sealant is arranged between the upper substrate and the lower substrate, the alignment film is arranged to extend outside the sealant area, and a surface of the alignment film exposed outside the sealant is provided with a sealing layer. In the invention, the alignment film is arranged to extend outside the sealant, which enable a narrow frame to be used to the LCD panel, and improves the utilization rate of the substrate; moreover, the alignment film exposed outside the sealant is sealed, to completely isolate the alignment film from the outside air; thus, the alignment film cannot be hydrolyzed because of absorbing the outside vapor, thereby ensuring the display quality.

16 Claims, 2 Drawing Sheets

LCD PANEL, LCD DEVICE, AND METHOD FOR MANUFACTURING PANEL

TECHNICAL FIELD

The invention relates to the field of liquid crystal displays (LCDs), and more particularly to an LCD panel, an LCD device, and a method for manufacturing a panel.

BACKGROUND

An LCD includes an upper substrate and a lower substrate. Opposite inner sides of the substrates are provided with a transparent electrode, and the electrode is coated with a layer of alignment film (PI) for aligning an initial position of a liquid crystal; and opposite outer sides of the substrates are provided with a polarizer. A layer of liquid crystal molecules is sandwiched between the two substrates. The LCD changes the polarization state of light by controlling the orientation of the liquid crystal molecules under an electric field, and achieves the penetrating and stopping of the optical path via the polarizer. Thus, the LCD can display the images.

Pat. Pub. No. CN101191935A, published on Apr. 6, 2008, discloses a substrate for an LCD panel, an LCD panel, and an LCD device. The substrate includes a display area, an edge area, and a sealant adhering area. The sealant adhering area is arranged between the display area and the edge area; a layer of alignment film is coated in the display area and the edge area, and the edge area is provided with a pattern area without being coated with the alignment film.

FIG. 1 shows another conventional LCD panel: the opposite inner sides of the two substrates are respectively coated with a layer of alignment film (PI), which is used to align the liquid crystal molecules, and a liquid crystal material is filled in the space formed by the two substrates and a sealant. A certain distance must be reserved between a periphery of the sealant and an edge of the panel, to ensure that the panel can be cut from a large master plate.

The alignment film (PI) generally is not overlapped with the sealant. However, with the development of a narrow frame technology, a part of LCDs begin to use a method that the alignment film (PI) is partially overlapped with the sealant, as shown in FIG. 2. The alignment film (PI) is made of a water absorbing material, if the alignment film (PI) is completely overlapped with the sealant, and the alignment film (PI) is in contact with the outside air, the alignment film (PI) will be hydrolyzed because of absorbing the outside vapor, and the reaction will spread into the panel; thus, the alignment of the liquid crystal molecules in the panel is affected, to cause the nonuniform display of the part near the frame, thereby generating serious murs.

SUMMARY

In view of the above-mentioned technical problems, the aim of the invention is to provide an LCD panel, an LCD device, and a method for manufacturing a panel that comprise a narrow frame and can improve the utilization rate of a substrate.

The aim of the invention is achieved by the following technical schemes:

An LCD panel comprises an upper substrate and a lower substrate which are arranged opposite to each other. Opposite inner sides of the upper substrate and the lower substrate are respectively provided with a layer of alignment film, a sealant is arranged between the upper substrate and the lower substrate, the alignment film is arranged to extend outside the sealant, and a surface of the alignment film exposed outside the sealant is provided with a sealing layer.

Preferably, the sealing layer is filled outside the sealant and between the upper substrate and the lower substrate. By using the sealing layer for filling and sealing, on the one hand, the alignment film exposed outside the sealant can be isolated from the outside air. On the other hand, a glass edge may generate a fine crack in the cutting process, the fine crack can spread into the panel when own stress of the panel is released, and the panel is easily broken from the crack when being impacted by outside force, thereby affecting the reliability of the panel, which is especially important on a mobile display device. By using the sealing layer for filling, the fine crack generated on the cut glass edge can be effectively prevented from spreading into the panel, thereby improving the reliability of the panel.

Preferably, a distance is reserved between the alignment film exposed outside the sealant and an edge of the LCD panel. The technical scheme can prevent the phenomenon that adjacent panels cannot be cut apart or a cut edge is poor because of the adhesion of the sealant between adjacent panels from occurring. In addition, if the alignment film is flush with the edge of the LCD panel, to ensure the sealability, the sealing layer is inevitably covered on the edge of the LCD panel, thereby affecting planeness of the edge of the LCD panel. The distance is reserved between the edge of the alignment film and the edge of the LCD panel, and the sealing layer is arranged on surfaces of the alignment film and the substrate, which can achieve the reliable sealing of the LCD panel.

Preferably, the sealing layer is made of a water-based glue material. The water-based glue material has strong plasticity, which facilitates the sealing and coating operation, after that, the water-based glue material is cured and shaped; the operation is simple, thereby improving the production efficiency.

Preferably, the water-based glue material is an epoxy resin. This is one specific material of the water-based glue material.

Preferably, the water-based glue material is an organic silicon glue. This is another specific material of the water-based glue material.

An LCD device comprises the aforementioned LCD panel.

A method for manufacturing an LCD panel comprises the following steps:

A: Coating an alignment liquid on an upper substrate or a lower substrate which are matched with each other, to form an alignment film;

B: Coating a sealant on the alignment film, to form a sealant frame; covering the matched lower substrate or upper substrate after filling a liquid crystal in a display area formed the sealant frame; after that, cutting along a periphery of the sealant, to form the LCD panel; and C: Sealing the alignment film of the LCD panel exposed outside the sealant, to isolate the sealant from the outside air.

Preferably, in the step A, when coating the alignment film, a distance is reserved between an edge of the alignment film and an edge of the LCD panel. The technical scheme can prevent the phenomenon that adjacent panels cannot be cut apart or a cut edge is poor because of the adhesion of the sealant between adjacent panels from occurring. In addition, if the alignment film is flush with the edge of the LCD panel, to ensure the sealability, a sealing layer is inevitably covered on the edge of the LCD panel, thereby affecting the planeness of the edge of the LCD panel. The distance is reserved between the edge of the alignment film and the edge of the LCD panel, and the sealing layer is arranged on surfaces of the alignment film and the substrate, which can achieve the reliable sealing of the LCD panel.

Preferably, in the step C, a sealing process comprises: filling a water-based glue material between the sealant and the edge of the LCD panel, to isolate the alignment film from the outside air. By using the sealing layer for filling and sealing, on the one hand, the alignment film exposed outside the sealant can be isolated from the outside air. On the other hand, a glass edge may generate a fine crack in the cutting process, the fine crack can spread into the panel when own stress of the panel is released, and the panel is easily broken from the crack when being impacted by outside force, thereby affecting the reliability of the panel, which is especially important on a mobile display device. By using the sealing layer for filling, the fine crack generated on the cut glass edge can be effectively prevented from spreading into the panel, thereby improving the reliability of the panel.

Preferably, after filling the water-based glue material, the step C further comprises the step: curing the water-based glue material. Wherein, the water-based glue material is coated on the alignment film exposed outside the sealant frame, and then the water-based glue material is cured by thermocuring or/and UV-curing. This is a specific curing mode of the water-based glue material.

In the invention, the alignment film is arranged to extend outside the sealant, which enable a narrow frame to be used to the LCD panel, and improves the utilization rate of the substrate. Moreover, the alignment film exposed outside the sealant is sealed, to completely isolate the alignment film from the outside air; thus, the alignment film cannot be hydrolyzed because of absorbing the outside vapor, thereby ensuring the display quality.

Legends: 110. upper substrate; 120. lower substrate; 200. alignment film; 300. sealant; 400. water-based glue material.

DETAILED DESCRIPTION

The invention will further be described in detail in accordance with the figures and the preferable examples.

Figure 1:
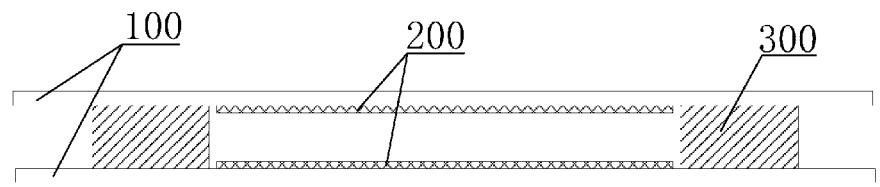
FIG. 1 is a schematic diagram of a conventional LCD panel.
Figure 2:
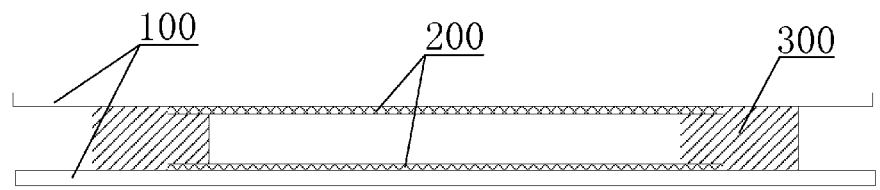
FIG. 2 is a schematic diagram of another conventional LCD panel.
Figure 3:
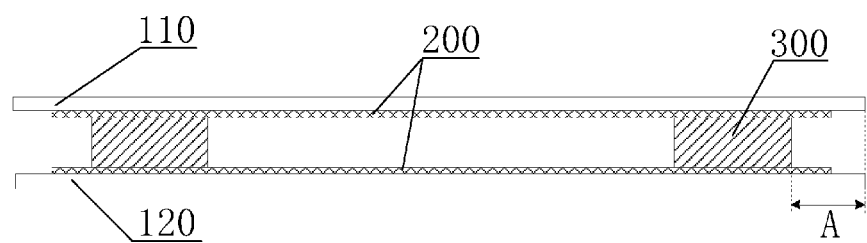
FIG. 3 is a schematic diagram of an LCD panel before sealing an alignment film of the invention.
Figure 4:
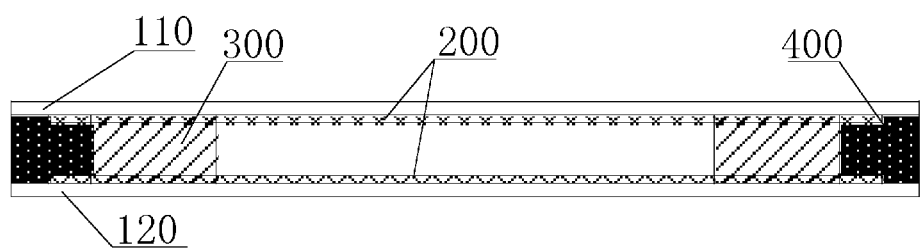
FIG. 4 is a schematic diagram of a specific mode of sealing an alignment film of the invention.

As shown in FIG. 3 and FIG. 4, an LCD device comprises an LCD panel; the LCD panel comprises an upper substrate 110 and a lower substrate 120 which are arranged opposite to each other; opposite inner sides of the upper substrate 110 and the lower substrate 120 are respectively provided with a layer of alignment film 200, and a sealant 300 is arranged between the upper substrate 110 and the lower substrate 120; the sealant 300 is fully arranged on a surface of the alignment film 200, namely the alignment film is arranged to extend outside the sealant. A distance is reserved between the alignment film 200 exposed outside the sealant 300 and an edge of the LCD panel, which prevents the phenomenon that adjacent panels cannot be cut apart or the cut edge is poor because of the adhesion of the sealant between adjacent panels from occurring.

Figure 5:
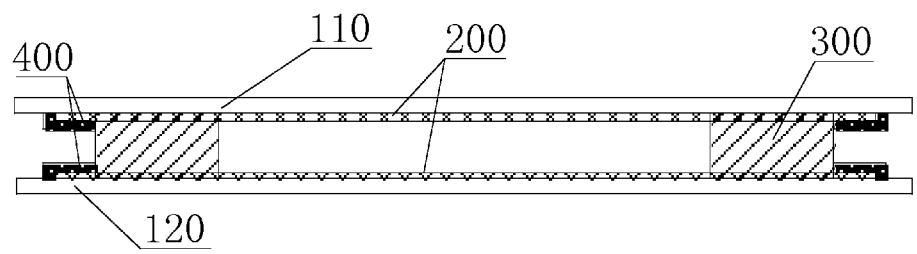
FIG. 5 is a schematic diagram of another specific mode of sealing an alignment film of the invention.

As shown in FIG. 4, the surface of the alignment film 200 exposed outside the sealant 300 is provided with a sealing layer, and the alignment film 200 is isolated from the outside air. Specifically, the distance is reserved from the edge of the alignment film 200 (PI) to an edge of the glass, and the sealing layer is filled between the sealant 300 and the edge of the LCD panel. Thus, the alignment film 200 exposed outside the sealant 300 is fully sealed in the sealing layer. Therefore, on the one hand, the alignment film 200 exposed outside the sealant 300 can be isolated from the outside air; on the other hand, a glass edge may generate a fine crack in the cutting process, the fine crack can spread into the panel when own stress of the panel is released, and the panel is easily broken from the crack when being impacted by outside force, thereby affecting the reliability of the panel, which is especially important on a mobile display device, by using the sealing layer for filling, the fine crack generated on the cut glass edge can be effectively prevented from spreading into the panel, thereby improving the reliability of the panel. Optionally, as shown in FIG. 5, the sealing layer is only arranged on the surface of the exposed alignment layer, which can achieve reliable sealing, thereby favoring reducing the use of the sealing layer material, and decreasing material cost.

The sealing layer can be made of a water-based glue material 400 such as epoxy resin, an organic silicon glue, etc.; the water-based glue material has strong plasticity, which facilitates the sealing and coating operation, after that, the water-based glue material is cured and shaped; the operation is simple, thereby improving the production efficiency.

A method for manufacturing an LCD panel comprises the following steps:

A: Coating an alignment liquid on an upper substrate or a lower substrate which are matched with each other, to form an alignment film;

B: Coating a sealant on the alignment film, to form a sealant frame; covering the matched lower substrate or upper substrate after filling a liquid crystal in a display area formed the sealant frame; after that, cutting along the periphery of the sealant, to form the LCD panel; and C: Sealing the alignment film of the LCD panel exposed outside the sealant, to isolate the sealant from the outside air.

A distance is reserved between the alignment film 200 exposed outside the sealant 300 and an edge of the LCD panel, to prevent the phenomenon that adjacent panels cannot be cut apart or a cut edge is poor because of the adhesion of the sealant between adjacent panels from occurring.

The water-based glue material 400 is filled between the sealant 300 and the edge of the LCD panel, to isolate the alignment film 200 from the outside air. And the water-based glue material 400 is cured by one or two modes of thermo-curing and UV-curing. By using the water-based glue material 400 for filling, on the one hand, the alignment film 200 exposed outside the sealant 300 can be isolated from the outside air; on the other hand, a glass edge may generate a fine crack in the cutting process, the fine crack can spread into the panel when own stress of the panel is released, and the panel is easily broken from the crack when being impacted by the outside force, thereby affecting the reliability of the panel, which is especially important on a mobile display device. By using the water-based glue material for filling, the fine crack generated on the cut glass edge can be effectively prevented from spreading into the panel, thereby improving the reliability of the panel.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

I claim:

1. An LCD panel, comprising: an upper substrate and a lower substrate which are arranged opposite to each other; opposite inner sides of said upper substrate and said lower substrate are respectively provided with a layer of alignment film, a sealant is arranged between said upper substrate and said lower substrate, each of the alignment films is arranged to extend outside said sealant, and a surface of each of the alignment films exposed outside said sealant is provided with a sealing layer, each sealing layer is only arranged on the surface of the exposed alignment layer, and the sealing layer arranged on the upper substrate is spaced from the sealing layer arranged on the lower substrate.

2. The LCD panel of claim 1, wherein said each sealing layer is filled outside said sealant and between said upper substrate and said lower substrate.

3. The LCD panel of claim 1, wherein a distance is defined between said each alignment film exposed outside said sealant and an edge of said LCD panel, and the alignment films do not reach the edges of the substrate.

4. The LCD panel of claim 1, wherein said each sealing layer is made of a water-based glue material.

5. The LCD panel of claim 4, wherein said water-based glue material is an epoxy resin.

6. The LCD panel of claim 4, wherein said water-based glue material is an organic silicon glue.

7. An LCD device, comprising: an LCD panel; wherein said LCD panel comprises an upper substrate and a lower substrate which are arranged opposite to each other; opposite inner sides of said upper substrate and said lower substrate are respectively provided with a layer of alignment film, a sealant is arranged between said upper substrate and said lower substrate, each of the alignment films is arranged to extend outside said sealant, and a surface of each of the alignment films exposed outside said sealant is provided with a sealing layer, each sealing layer is only arranged on the surface of the exposed alignment layer, and the sealing layer arranged on the upper substrate is spaced from the sealing layer arranged on the lower substrate.

8. The LCD device of claim 7, wherein said each sealing layer is filled outside said sealant and between said upper substrate and said lower substrate.

9. The LCD device of claim 7, wherein a distance is defined between said each alignment film exposed outside said sealant and an edge of said LCD panel, and the alignment films do not reach the edges of the substrate.

10. The LCD device of claim 7, wherein said each sealing layer is made of a water-based glue material.

11. The LCD device of claim 10, wherein said water-based glue material is an epoxy resin.

12. The LCD device of claim 10, wherein said water-based glue material is an organic silicon glue.

13. A method for manufacturing an LCD panel, comprising:
   A: Coating an alignment liquid on each of an upper substrate and a lower substrate which are matched with each other, to form two alignment films;
   B: Coating a sealant on said each alignment film, to form a sealant frame; covering the matched lower substrate and upper substrate after filling a liquid crystal in a display area formed said sealant frame; after that, cutting along a periphery of said sealant, to form said LCD panel; and
   C: Sealing each alignment film of said LCD panel exposed outside said sealant on the upper substrate and the lower substrate to respectively form a sealing layer, to isolate said sealant from the outside air, each sealing layer is only arranged on the surface of the exposed alignment layer, and the sealing layer arranged on the upper substrate is spaced from the sealing layer arranged on the lower substrate.

14. The method for manufacturing an LCD panel of claim 13, wherein in said step A, when coating said alignment film, a distance is defined between an edge of said each alignment film and an edge of said LCD panel, and the alignment films do not reach the edges of the substrate.

15. The method for manufacturing an LCD panel of claim 13, wherein in said step C, a sealing process comprises filling a water-based glue material between said sealant and an edge of said LCD panel, to isolate said each alignment film from the outside air.

16. The method for manufacturing an LCD panel of claim 13, wherein after filling a water-based glue material, said step C further comprises a step that curing said water-based glue material, in which said water-based glue material is coated on said each alignment film exposed outside said sealant frame, after that, said glue material is cured by one or two modes of thermocuring and UV-curing.

* * * * *